United States Patent Office 3,231,515
Patented Jan. 25, 1966

3,231,515
CATALYSTS
Karl Ziegler, Kaiser Wilhelm Platz 1, Mulheim (Ruhr), Germany, and Heinz Breil, Erhard Holzkamp, and Heinz Martin, all of Mulheim (Ruhr), Germany; said Breil, said Holzkamp, and said Martin assignors to said Ziegler
No Drawing. Filed July 1, 1958, Ser. No. 745,809
Claims priority, application Germany, Dec. 27, 1954
Z 4,628, Z 4,629; Aug. 3, 1954, Z 4,348
14 Claims. (Cl. 252—429)

This invention relates to new and useful improvements in catalysts and is a continuation in part of copending applications Ser. No. 554,609, and now abandoned, and Ser. No. 554,631 both filed December 22, 1955, which only contains material disclosed in said applications and which constitutes a consolidation of said applications.

The polymerization of ethylene for the production of polymers ranging from gaseous through solid polymers is well known. When producing solid polymers from gaseous ethylene, high pressures of, for example 1000 atmospheres and more were generally required and oxygen or peroxides were generally used as the polymerization catalyst. The yield obtained by these conventional methods was generally low with, for example, about 15–20% of the ethylene being converted in a single operation into the polyethylene.

The highest polyethylene polymer which could be effectively obtained by the prior known methods had a molecular weight of about 50,000.

It has also been proposed to polymerize ethylene using aluminum trialkyls as the polymerization catalyst. This polymerization reaction, however, is generally intended for producing low molecular polymers not ranging substantially above the liquid range. It has further been proposed to modify the polymerization using the aluminum trialkyl catalysts by the addition of auxiliary catalysts such as nickel or cobalt. In this connection, there are obtained low molecular polymerization products, such as a butene-1.

Higher molecular polyethylenes may also be obtained from ethylene using an aluminum trialkyl catalyst by selecting a siutable quantity ratio of the aluminum trialkyl to the ethylene. It is, however, very difficult to otbain polyethylene of a molecular weight higher than a few thousand as it is necessary to use a very small quantity of the aluminum trialkyl as, for example, aluminum triethyl for the production of higher molecular products. With the use of such small quantities of the aluminum trialkyl, however, the reaction becomes very sensitive to traces of impurity in the ethylene and proceeds very slowly, since the quantity of catalyst in the total reaction mixture is very small.

Co-pending application No. 469,059 describes a process for the production of such high molecular weight polyethylenes of plastic type by bringing together ethylene and catalysts which consist of mixtures of aluminum trialkyls with compounds of metals of the 4th to 6th side groups of the Periodic System, including thorium and uranium.

Co-pending application No. 482,413, and now abandoned, describes the production of such high molecular weight polyethylenes of plastic character by bringing together gaseous ethylene and catalysts which consist of mixtures or organic compounds of magnesium and/or zinc and compounds of metals of the 4th to 6th side groups of the Periodic System including thorium and uranium, under conditions under which the metal compounds are neither reduced to free metal nor ionized.

One object of this invention is a new catalyst useable inter alia for obtaining high molecular weight products which may be used as plastics.

A further object of this invention is a new catalyst useable inter alia for the polymerization of ethylenically unsaturated hydrocarbon products with a higher yield than heretofore obtainable.

A still further object of the invention is a new polymerization catalyst for obtaining polymers having molecular weights higher than those heretofore obtainable.

Another object of the invention is a polymerization catalyst for lower olefins up to about $C_5$ and particularly ethylene.

These and still further objects will become apparent from the following description:

In accordance with an application of the invention at least one ethylenically unsaturated hydrocarbon of the general formula $CH_2=CHR$ is polymerized into high molecular products by contact with our novel catalyst. The latter is composed of a mixture of a first and second component, said first component being substantially composed of a member of the group consisting of alkali metal alkyls, -aryls, -aralkyls and -alkylaryls, complexes of alkali metal alkyls with a metal organo compound of the group of metals consisting of aluminum, magnesium and zinc, and complexes of alkali metal hydrides with a metal organo compound of said groups of metals and complexes constituted of two metal organo compounds of said groups of metals, the balance, if any, of said first component being at least one metal organo compound of the group consisting of aluminum, magnesium and zinc hydrocarbon, their hydrides and halides, said second component being a heavy metal compound selected from the group consisting of the non-ionized salts, including organic salts, and the freshly precipitated oxides and hydroxides of metals of groups IV-B, V-B and VI-B of the Periodic System including thorium and uranium. R in said formula may be hydrogen or a hydrocarbon radical. A satisfactory catalyst is obtained without the presence of an organo metal compound of Al, Zn and Mg, although the presence of the latter will give in most cases improved results. Organo metal compounds for use in catalysts are described in detail in our copending application Ser. No. 692,020 filed Nov. 26, 1957, Ser. No. 554,631 filed Dec. 22, 1955, Ser. No. 482,412 and Ser. No. 482,413, and now abandoned, both filed Jan. 17, 1955.

The designation aryl or similar expression as used herein generically, in identification of an organo metal compound, is intended to include, as it well understood in the art, an organo metal compound having one or more aryl, aralkyl or alkylaryl substituents.

The term "non-ionized salt" as used herein is intended to designate the true salt as such and which under the conditions of the formation of the catalyst mixture and the contacting with the ethylenically unsaturated hydrocarbon is not reduced to free metal and is not ionized.

Except as otherwise limited herein, the term "salt" or "salts" designating a compound having a heavy metal of the IV-B, V-B and VI-B groups of the Periodic System, including thorium and uranium, is employed in its broadest sense, i.e. to connote the reaction product between a base and an acid, including products of the type of acetylacetonates and further including salts in which said periodic system group member is present as a cation as well as those in which such member is present as an anion such as in products of the type of titanates, zirconates, chromates, molybdates or tungstates. The term "pure alcoholates" hereafter used in designation of the said "salts" is intended to connote "salts" having solely alcoholate radicals attached to said heavy metal. "Mixed alcoholates" of said heavy metals as hereafter referred to are such salts having at least one alcoholate radical and at least one non-alcoholate radical.

Particularly good results are produced with heavy metal compounds which are soluble in inert organic solvents such as hydrocarbons.

The term "high molecular" as used herein is intended to designate molecular weights of more than 2,000, and preferably more than 10,000.

The herein designated numerical values for molecular weights are based, in accordance with conventional practice, on the viscosity of the solutions of the polyethylene for which the molecular weight determination is to be made. This viscosity is expressed as "intrinsic viscosity" ($\eta$) which is to be calculated on the basis of an equation given by Schulz and Blaschke (Journal für Praktische Chemie, volume 158 (1941), pp. 130–135, Equation 5, B.P. 132) and corrected for the therein mentioned specific viscosity according to Fox (Fox and Flory J. Am. Soc. 73 (1951), p. (1901). The average molecular weight, as for instance that of 50,000 above given, is calculated from such intrinsic viscosity by way of the modified equation of R. Houwink (Journal für Praktische Chemie, new Edition 157 (1940), pp. 15–16, Equation 5):

$$MW = Kx(\eta)^a$$

for which the constant $K = 2.51 \times 10^4$
and the constant $a = 1.235$

On the basis of molecular weights calculated in this manner, polyethylenes having molecular weights of 300,000 up to 3,000,000 and more may be obtained in accordance with the invention.

In general the metal hydrocarbon is preferably one in which the substituents possess from 0 to one and more aromatic hydrocarbon rings of from $C_6$ to $C_{10}$, i.e., the benzene and naphthalene rings.

The catalyst of the invention is superior in its polymerizing use to the known process, using metals in ionic state, with respect to the effectiveness of the catalysts and hence the velocity of the polymerization to high molecular weight polyethylenes.

Suitable organo-alkali metal compounds for use in the present invention are alkali metal alkyls and aryls, for example lithium, sodium or potassium methyl, ethyl, propyl, isobutyl and higher (in excess of $C_5$) alkali metal alkyls. Convenient higher alkyls are for instance those within the range of average composition of octyl or dodecyl or their mixtures. The higher -alkyls are without limitation to the number of carbon atoms. Examples of aryls which may be employed are: phenyl, tolyl, xylyl and naphthyl and include such aralkyls (the metal is linked to the aliphatic chain) as benzyl or phenyl ethyl. It is also possible to use complex compounds of these alkali metal alkyls or aryl with organic compounds of aluminum, magnesium or zinc such as are described in said co-pending applications 692,020, 482,412, 482,413, and now abandoned, and 554,631, for example with aluminum trialkyls or aryls or alkyl or aryl aluminum halides or hydrides or corresponding Zn or Mg compounds. It is also possible to use complex compounds of alkali metal hydrides with organic compounds of aluminum, magnesium or zinc. Thus compound of the formulae: $Na[Al(C_2H_5)_4]$, $Li[Al(CH_3)_2H_2]$, $$Na[Al(C_6H_5)_3H]$$

or $Mg[Al(C_2H_5)_4]_2$, can be used.

The heavy metal catalyst component useful in accordance with the invention may be any compound of a metal on the left hand side of the IVth to VIth Groups of the Periodic System, including thorium and uranium. In certain of the newer Periodic Charts of the Elements, these metals on the left hand side of the IVth to VIth Groups of the Periodic System are designated as Groups IV–B, V–B and VI–B respectively. The term "heavy metal" is used herein in contrast with the relatively lighter metals in the "first" catalyst component. When reference is made herein and in the claims to metals of Groups IV–B, V–B and VI–B of the Periodic System, there is intended any member of these groups, including thorium and uranium, as for example, titanium, zirconium, hafnium, thorium, uranium, vanadium, niobium (columbium), tantalum, chromium, molybdenum and tungsten. Any compound of these metals such as the halogenides, for example chlorides or bromides, oxyhalogenides, for example oxychlorides, complex halogenides, for example complex fluorides, freshly precipitated oxides or hydroxides or organic compounds, for example pure alcoholates of the type of esters such as titanium-, zirconium- etc. tetrabutyl esters, mixed alcoholates, acetates, benzoates or acetyl acetonates and similar compounds may be used. Also mixed compounds, as for example of the type of mono-, di- or tri-halogeno (preferably chloro-) alcoholates of said heavy metals may be used. Salts of titanium, zirconium, uranium, thorium and chromium have been found to be preferable.

A particularly active catalyst in accordance with the invention may be obtained, for example, by mixing a titanium or zirconium compound, such as a tetrachloride, oxychloride or acetyl acetonate with the herein specified "first" component organo metal compound.

The exact nature of the catalyst produced by the mixing of the metal compound of Group IV–B, to VI–B and the organo metal compound is not known. The heavy metal compound is converted to a lower valency form. Thus, for example, upon bringing together the tetravalent zirconium compound and alkali metal alkyl, there is formed a compound of monovalent, bivalent or trivalent zirconium. The fact that the quadrivalent zirconium salt undergoes a conversion may be clearly noted from the fact that the initially colorless salt dissolves in metal alkyl, becoming darker in color and generating heat. While the special polymerizing action of the catalyst in accordance with the invention may come from the combination with the organo metal "first" component, probably the low valence group IV–B, V–B or VI–B metal compound has a high polymerization effect by itself, since for example the action of a metal alkyl derived catalyst on ethylene starts at a lower temperature and takes place more rapidly than the normal reaction of such alkyl with ethylene.

Within the broadest concept of the invention the ratio of organo metal compound (including any halide) to heavy metal compound is not critical with respect to the obtaining per se of high molecular polymers such as exemplified by polyethylenes with molecular weights from 10,000 to 3,600,000 and higher. Expressed in mol ratios they may run from fractions, as for example 0.1 or even less, to multiples of 1, such as 12 or higher, of $$\frac{\text{organo metal compound}}{\text{heavy metal compound}}$$

In the event that the heavy metal compound is a pure alcoholate, it is preferable to utilize a mol ratio of $$\frac{\text{organo metal compound}}{\text{heavy metal compound}}$$

of at least about 10:1 since such alcoholates will also produce dimers and the dimerization is increasingly favored with decreasing mol ratios.

Whenever the primary objective is to assure that particularly high molecular weights are secured for the polymer produced by use of the catalyst in accordance with the invention, or, when oxydizing impurities, as for example moisture or oxygen, are present, such as in ethylene, or in any solvent, it is preferred to utilize an excess of organo metal compound. In that case it is of advantage to use at least 2 mols of the organo metal compound for each mol of heavy metal compound regardless of its valence and preferably, in the case of heavy metal compounds other than acetyl acetonates, $2n$ to $3n$ mols of the organo metal compound to every mol of the heavy metal compound "$n$" being the valence of the heavy metal.

A typical illustration of such mol ratios is for instance a combination composed of one mol of a tetravalent titanium salt such as $TiCl_4$ and 8–12 mols of organo metal compound. The reasons for the desirability of an excess of this compound, in the event of for example the presence of oxydizing impurities, are based on the following considerations:

When the organo metal compound acts for instance on the tetravalent titanium salt, a reduction takes place which, however, does not reduce the titanium to metallic titanium. If the organo metal compound reacts at first only with one of its hydrocarbon radicals such as an alkyl, as for instance an ethyl group as is true in general for the reactivity of these organo metal compounds, not more than three molecules of organo metal compound will presumably be consumed in the reduction of the tetravalent titanium salt. An excess of hydrocarbon radical component beyond that serving for preparing the catalytically effective material is then normally present when using the above referred to multiple mol amounts specified for heavy metal compound combinations other than acetylacetonates. The excess of organo metal compound is of value to counteract the oxidizing action of impurities frequently present when utilizing the catalyst. Thus in ethylene there may be present, for example, moisture or oxygen which oxidize the air sensitive catalysts and thus impair their activity. The excess of the organo metal compound prevents this oxidation or reduces the already oxidized catalyst to eliminate impurities possibly present in the ethylene.

The minimum quantities of the catalysts in relation to its application to a monomer, for example olefin such as ethylene, may vary within very wide limits and are dependent upon the purity of the material to be polymerized. When using for instance very pure ethylene, 0.1 part of catalyst to 1,000 parts of ethylene will already be sufficient. It is evident that larger quantities can be used even in the case of pure ethylene. However, it is desirable to avoid using unnecessarily large quantities of catalyst so as not to make the working up process more difficult than is necessary. Taking very impure monomer, such as ethylene, good results can nevertheless be obtained with quantities of catalysts amounting to only a few percent. If solvents are used for the polymerization, the same applies in connection with the purity of the solvents. The quantities of catalysts employed influence the molecular weight of the polymers produced so that the degree of polymerization and thus the molecular weight will be higher the smaller the quantity of catalysts employed. On the other hand the higher the catalyst concentration the lower will be the molecular weight.

The influencing of the molecular weight however by altering the concentration of the catalyst, has its limitations, in that an increase in the catalyst concentration leads to an increased consumption of catalyst and this makes the process more expensive. In addition, the polymers obtained with high catalyst concentrations contain more ash than those made with low catalyst concentrations and must have this ash removed therefrom by complicated lixiviation or washing with solvents. On the other hand, when the catalyst concentration is considerably reduced for the purpose of raising the molecular weight, the reaction velocity of the polymerization is appreciably reduced and consequently also the yield per unit of volume and time.

Moreover, the control of molecular weight by variation of catalyst concentration cannot readily be applied to the range of molecular weights below 100,000, which is a particularly important range in practice.

It is in many cases possible, however, to obtain for the polymers variations in molecular weight in a manner avoiding or at least appreciably minimizing some or all of the disadvantages entailed by variation in catalyst concentration and to secure benefits not obtainable by the latter method. This practice is set forth in our co-pending application 527,413 filed August 9, 1955 (also continuation-in-part application Ser. No. 692,020 filed Nov. 26, 1957), which is based on the discovery that for catalyst combinations, useable in accordance with the ilnvention, variations in mol ratios of $$\frac{\text{organo metal compound}}{\text{heavy metal compound}}$$

may produce different molecular weight polymers. Broadly speaking, lower mol ratios will yield lower molecular weight products and higher mol ratios will give higher molecular weight products. It is thus possible of a given catalyst combination to obtain polymers of predetermined molecular weights by selecting specific predetermined mol ratios for that combination.

The mol ratio variation effect is in each case readily ascertainable from the curve or graph obtained when plotting different mol ratios of given catalyst combinations, useful in accordance with the invention, against the respective molecular weights of the polymers obtained by the use of these given combinations.

Polymerization with the catalysts in accordance with the broad and generic scope of invention is effected by merely contacting the material to be polymerized with the above described catalyst. This may be carried out under reaction conditions generally considered and conventionally termed in the art as "mild" reaction condition (as to temperature and pressure). The contacting may be effected at normal or up to about 10 atmospheres pressure or at comparatively low pressures of about 10–100 atmospheres; the contacting pressure is not critical and a smooth polymerization may be effected at atmospheric or sub-atmospheric pressures. On the other hand, the action of the new catalyst remains fundamentally unchanged even if the pressure is increased to any desired obtainable value. It is advantageous to work at pressures of 1 to 10 atmospheres. It is an outstanding advantage of the invention that one may operate at ordinary atmospheric pressure with excellent results.

The monomer may be added in vapor phase which is of particular advantage when using normally gaseous olefins such as ethylene.

Previously known high pressure ethylene polymerization processes have the further disadvantage that ordinarily only a relatively small proportion of approximately 15 to 20% of the ethylene introduced is converted into polyethylene. On the other hand, ethylene treated with a catalyst in accordance with the invention is predominantly converted. Moreover, the ethylene to be employed with the catalyst of the invention need not be so pure as in the known high pressure processes. The temperature of the contacting is not critical and the same may be effected at room temperature or below. It is advantageous to operate at somewhat eleavted temperatures and particualrly above about 50° C. Thus, in olefin polymerization, as contrasted to prior art processes, the monomer contacted with a catalyst in accordance with the invention may be rapidly converted into high molecular polymer even at low pressures of less than 100 atmospheres and temperatures of less than 100° C. Working at temperatures above 250° C. is not advisable because at this temperature the catalysts may decompose to a considerable extent.

In the practical application of the invention it is also possible to contact the novel catalyst material with several ethylenically unsaturated hydrocarbons to thereby obtain copolymerization. Thus, a mixture of olefins such as an ethylene containing gas mixture may be directly used for the polymerization, for example gases which are generated during the cracking of saturated hydrocarbons, such as ethane or propane, or from mineral oil or its fractions, or generated during similarly conducted Fischer-Tropsch synthesis; if desired they may be freed from other olefins than those desired for the polymerization.

The activity of the catalyst and the degree of polymerization of the final substances obtained are dependent upon the metal compounds selected, the manner of its preparation and the ratio of the quantity of the heavy metal compound to the quantity of the organo metal compound, the latter determining largely the degree of polymerization as above set forth.

Thus, it has been found that, when using sufficient quantities of the Group IV-B, to VI-B metal-containing components of the catalyst, titanium-containing catalysts are more active than zirconium-containing catalysts.

It is in many cases preferred to operate in the presence of solvents. The solvents should not dissociate or promote the dissociation of the heavy metal compound and particularly the heavy metal salts. Accordingly, solvents having a high dielectric constant such as water, methyl-alcohol or the like should not be used. Such solvents furthermore tend to destroy the organo metal compounds. Suitable non-dissociating or destroying solvents are: aliphatic and hydroaromatic hydrocarbons such as pentane, hexane, cyclohexane, tetrahydronaphthalene, decahydronaphthalene; higher paraffins, also in mixtures; paraffins liquid at the reaction temperature; aromatic hydrocarbons, such as benzene, xylol, halogenated aromatic hydrocarbons, such as o-dichloro-benzene, chlorinated naphthalene; ethers such as dibutyl-ether, dioxane, tetrahydrofurane. These solvents are used in such quantities that it is still possible to stir the reaction mixture even when it is nearing the end of the reaction. Generally this stirring operation is possible even when the reaction mixture, as in the case of ethylene, contains 10 to 40% polyethylene at the end of the reaction. Maximum limits only exist as regards the economy of the process.

Polyethylenes obtained by use of the catalyst in accordance with the invention, as has been set forth above, have an extremely high molecular weight which may range up to 3,000,000 and more. These polyethylenes are believed to be completely novel and different from the solid polyethylene polymers previously obtained. These new polyethylenes have a softening point or melting point, which will be generically referred to herein as the softening point, of more than 130° C. and are insoluble in all solvents at room temperature.

The polyethylenes produced in accordance with the invention, having a molecular weight up to 100,000 will in most solvents only partially dissolve at a temperature above about 70° C., while those having a molecular weight above 100,000, will only partially dissolve in such solvents at temperatures above about 100° C. The temperature stability or resistance of the new polyethylenes is greater than that of the known conventional polyethylenes. Upon heating the new products to temperatures above 250° C., they retain their white color, while the color of the known products changes to gray between 200 and 250° C. The resistance of the new polyethylenes to oxidation by atmospheric oxygen is also much greater.

The polyethylenes in accordance with the invention have a high crystal content which is unusual for high molecular hydrocarbons. The degree of crystallization, as shown by X-ray diagrams, generally amounts to 80% and in many cases even higher. At times also lower values may occur. The crystallinity remains unchanged to a temperature of 100° C. or higher and disappears only near the softening point.

The polyethylenes are almost completely linear in molecular structure and have practically no branch chains. In general, the percentage of the methyl groups is relatively small, being at most about 0.03% and in some cases even less than 0.01%. Infra-red spectrographs of the new products in accordance with the invention do not show the characteristic methyl band of the prior known polyethylenes.

The tear strength of the polyethylenes in accordance with the invention is a minimum of about 100 kilograms per square centimeter. The tensile strength in undrawn condition is more than about 200 kilograms per square centimeter and in elongation-oriented films or sheets up to about 3,000 kilograms per square centimeter.

The products may be worked directly, for example, between heated plates, into clear, transparent, elastic and flexible plates or sheets. The polyethylenes are also well suited for working in extrusion presses or for injection molding. In molten state they can be spun into threads by the methods usually employed for spinning super-polyamide threads. They may be cold drawn and may be drawn in this manner into ribbons, wires, or filaments of high elasticity and strength such as have never been obtained with prior known polyethylenes. Already in the working, the new polyethylenes show a remarkable tendency toward fiber formation. The threads produced from the new polyethylenes can be used as threads for industrial purposes. The new products can be spun to form filaments in the molten state by the methods which are conventional for the spinning of superpolyamide fibers such as nylon fibers. The filaments produced from the new polyethylenes can be employed as fibers for industrial purposes.

In copolymers produced with the catalysts according to the invention, either the alpha-olefin or the other monomer or monomers may predominate in the copolymer molecule. Thus we have produced copolymers of propylene and ethylene containing by weight in the polymer molecule 10% of propylene and 90% of ethylene. We have also produced copolymers containing, in the polymer molecule 30% of isobutylene and 70% of ethylene. Copolymers containing, in the polymer molecule 50% of propylene and 50% of ethylene have been prepared by the method described herein. Copolymers containing up to 70% ethylene and up to 30% propylene are contemplated.

The following examples of the application of the catalysts in accordance with the invention are given by way of illustration and not limitation, all operations involving the handling or obtaining of normally pyrophorous materials or of those tending to be pyrophorous and especially the catalyst combinations being carried out in an inert atmosphere such as $N_2$, as is conventional practice in the art.

*Example 1*

10 cc. of a 6-molar lithium butyl solution in benzene were ground together with 1 g. of zirconium tetrachloride and 70 cc. of hexane for two hours in an oscillating ball mill with exclusion of air. The blackish-brown suspension produced was introduced in an atmosphere of nitrogen into a 100 cc. autoclave and 40 g. of ethylene were pumped in. The autoclave was then heated with shaking to 100 to 110° C. and the pressure rose to 80 atmospheres. After four hours the pressure had fallen to 25 atmospheres and after a further 20 hours had fallen to 10 atmospheres. After cooling 3 g. of ethylene were released. A thick paste of polyethylene in hexane, colored gray by catalyst residues, remained in the autoclave. For purification purposes the polyethylene was separated by filtration from solvent and boiled with methanolic hydrochloric acid, which dissolved out the catalyst residues contained in the polyethylene. The product was thereafter washed with methanol and acetone to remove adhering hydrochloric acid. In this way 35 g. of a pure, white product were obtained. Corresponding quantities of titanium tetrachloride, thorium-IV-acetylacetonate or chromium-III-acetylacetonate can be used in place of zirconium tetrachloride, when the reaction takes place analogously.

Example 2

A fine suspension was produced from 12 g. of sodium-aluminum tetramethyl (produced in a manner analogous to sodium aluminum tetraethyl, Journal of Organic Chemistry, vol. 5 (1940), page 111) and 80 cc. of hexane by by grinding intensively for one hour in an oscillating ball mill with exclusion of air. 4 g. of titanium tetrachloride dissolved in 20 cc. of hexane were added dropwise to this solution with stirring, whereby the suspension was colored black and evolution of gas became noticeable. This fine black suspension was then introduced into a 200 cc. autoclave. 40 g. of ethylene were pumped in and the autoclave was heated with shaking to 100° C. The pressure initially rose from 50 to 80 atmospheres and then fell in the course of 20 hours to 25 atmospheres. After cooling, 7 g. of ethylene were blown off. The autoclave contained 30 g. of polyethylene finely distributed in hexane and colored gray-black by the catalyst. For purification purposes the polyethylene was filtered off from the solvent and boiled out with methanolic hydrochloric acid. After washing with methanol and acetone and drying at 80 to 100° C., a pure white finely powdered product remained.

Example 3

100 grams of a mixture of aluminum trialkyls, of the mean composition of aluminum tridodecyl produced as described in Example 5 of co-pending application No. 524,797 and now Patent No. 2,835,689, from cracking olefins, were dissolved in 200 cc. of hydrogenated Fischer-Tropsch diesel oil of boiling point 200 to 250° C. and heated with intensive stirring with 10 g. of sodium to 130 to 150° C. The solution was darkened in color by precipitated aluminum and a part of the sodium went into solution. The aluminum balled together with the excess sodium on slowly cooling the mixture to approximately 90° C.; the solution clarified and could be decanted from the deposited solid matter. Unlike the sodium aluminum tetramethyl of Example 2, the complex compound of the mean composition $Na(C_{12}H_{25})_4Al$ remains in solution in the diesel oil.

50 cc. portions of the solution were then employed for the following experiments:

(a) 50 cc. of the solution produced as described above were mixed with 600 cc. of Fischer-Tropsch diesel oil, the resultant solution was introduced into a 1-liter glass vessel and 1 g. of titanium tetrachloride dissolved in 500 cc. of diesel oil was added dropwise with stirring and exclusion of air, whereupon the solution blackened with separation of a finely divided precipitate. Ethylene was then passed in with vigorous stirring at 70 to 90° C. and polymerized in the reaction vessel to form polyethylene threads and agglomerates which slowly precipitate from the solvent. The addition of ethylene was regulated so that the unpolymerized ethylene flowing from the outlet tube into a bubble counter bubled only gently. The experiment was concluded after 5 minutes and the polyethylene produced was worked up as described in Example 2. In this way, 75 g. of a very pure white very finely powdered polyethylene were obtained.

(b) 3 grams of thorium-IV-acetylacetonate were added to 50 cc. of the above described solution and the resultant yellow colored solution was diluted with 30 cc. of hydrogenated Fischer-Tropsch diesel oil. The total solution was then introduced in an atmosphere of nitrogen into a 200 cc. autoclave and 33 g. of ethylene were pumped in. The autoclave was heated with shaking to 90° C. whereupon the pressure rose to 50 atmospheres. After 15 hours the pressure had fallen to 15 atmospheres. After cooling and blowing off the unpolymerized ethylene (8 g. in all) there remained in the autoclave 22 g. of powdery polyethylene suspended in hexane, which was worked up in the usual way as described in Example 2.

(c) 50 cc. of the above described solution were diluted with 350 cc. of hydrogenated Fischer-Tropsch diesel oil and with 2 g. zirconium-tetrachloride for 2 hours intensively ground in an oscillating ball mill. The dark brown suspension was introduced in an atmosphere of nitrogen into a 1-liter stirring autoclave and heated to 90° C. under a constant ethylene pressure of 10 atmospheres. After 10 hours the experiment was interrupted. After blowing off the excess ethylene, the polyethylene in the autoclave was worked up in the usual way after separation from the diesel oil. In this way 85 g. of pure white finely powdered polyethylene were obtained.

(d) 50 cc. of the complex salt solution were mixed with 150 cc. of hydrogenated Fischer-Tropsch diesel oil and 1.5 g. of chromium-III-bromide and were intensively ground for two hours in an oscillating ball mill. The black suspension produced was then treated in an atmosphere of nitrogen in a 500 cc. autoclave with 65 g. of ethylene. The initial pressure of 45 atmospheres increased on heating to 100° C. with shaking to 100 atmospheres and then decreased in the course of 40 hours to 25 atmospheres. After cooling 11 g. of ethylene were released. There remained in the autoclave a paste of ethylene polymers finely suspended in the diesel oil, which were worked up in the usual way to give 50 g. of a fine white polyethylene powder.

Example 4

29.3 g. of aluminum-tri-n-butyl dissolved in 35 cc. of hexane were mixed with stirring with 13.4 cc. of an 11 N sodium hydride suspension in hexane. The sodium hydride dissolved quantitatively on heating the mixture. The solution remained clear on cooling and nothing crystallized out. The crystallized complex salt sodium aluminum tributyl hydride remained as a residue on evaporating the hexane in vacuo.

10.5 grams of sodium aluminum tributyl hydride produced in this way were dissolved in 250 cc. of hexane and 4 g. of titanium tetrachloride dissolved in 20 cc. of hexane were added dropwise, whereupon the solution turned black. This catalyst mixture was stirred for 30 minutes at 40 to 60° C. and diluted with 2.2 liters of Fischer-Tropsch diesel oil and ethylene was passed in. After a reaction period of three hours at 60 to 90° C. a pasty solution was formed of polyethylene in the Fischer-Tropsch diesel oil. The reaction mixture was freed from the suspension medium by suctional filtration and the polyethylene was treated to purify it with butanolic hydrochloric acid at 90 to 100° C. for two hours, whereupon the catalyst residues contained in the polyethylene were dissolved out.

Finally, the polyethylene was washed with methanol and acetone and dried and 215 g. of polyethylene were thus obtained.

Example 5

250 cc. of ethereal 2 N ethyl magnesium chloride solution were introduced dropwise with vigorous stirring into 500 cc. of anhydrous toluene heated to boiling. Thereupon the Grignard compound precipitated as a white powder while the ether distilled off. The ether-free Grignard compound was obtained by distilling off the toluene in vacuo. 9 grams of ether-free ethyl magnesium chloride thus produced were heated together with 11.5 g. of aluminum triethyl and 25 cc. of hexane in a 200 cc. autoclave for six hours with vigorous shaking. After cooling and evaporating the centrifuged hexane solution, 7.5 g. of the complex magnesium di-aluminum octa-ethyl were obtained in the form of a thick oil.

Composition: 7.6% Mg, 17.0% Al. Calculated for $Mg[Al(C_2H_5)_4]_2$: Mg 7.84%, Al 17.4%).

This 7.5 g. of magnesium di-aluminum octa-ethyl were dissolved in 100 cc. of hexane and 4.5 g. of titanium tetrachloride dissolved in 50 cc. of hexane were added dropwise with vigorous stirring at 60–80° C. The catalyst mixture was introduced in an atmosphere of nitrogen into a 500 cc. autoclave, 75 g. of ethylene were pumped in and the mixture was heated with shaking to 100° C. The pressure fell in the course of 10 hours to 5 atmospheres gauge. 5 grams of ethylene were blown off after cooling. In the autoclave there remained a finely suspended paste of ethylene polymers in hexane, which gave 66 g. of a white polyethylene powder after the usual purification.

*Example 6*

5.8 g. of aluminum triethyl dissolved in 50 cc. of heptane were added dropwise with vigorous stirring in an atmosphere of nitrogen to 6 g. of zinc diethyl (produced by the process described in Ann. 152, 321 (1869) dissolved in 50 cc. of heptane and the mixture was heated for an hour to the boiling point of the solvent. After cooling the mixture was ground together with 4 g. of zirconium tetrachloride for two hours in an oscillating ball mill and the black suspension produced was transferred in an atmosphere of nitrogen into a 500 cc. autoclave. 65 g. of ethylene were pumped in and the mixture was shaken for 15 hours at 90° C. Meanwhile the pressure fell to 22 atmospheres gauge. After cooling 9 g. of ethylene were blown off. The autoclave contained a pasty suspension of polyethylene in heptane. 52 g. of white polyethylene were obtained after the usual purification.

*Example 7*

50 g. of aluminum tri-hexyl produced as described in co-pending application 524,797, Example 4, were dissolved in an atmosphere of nitrogen in 200 cc. of completely hydrogenated Fischer-Tropsch diesel oil of a boiling point of 200–250° C. and heated with intensive stirring with 10 g. of potassium to 120–130° C. The solution became dark colored due to precipitated aluminum and a part of the potassium went into solution. On slow cooling the aluminum settled with the excess potassium. The solution became clear and could be decanted from the solid sediment. The complex compound of the composition $KAl(C_6H_{13})_4$ was dissolved in diesel oil.

600 cc. of completely hydrogenated Fischer-Tropsch diesel oil were added to 50 cc. of the solution produced as described above, the combined solution was introduced into a one-liter glass vessel and to it 2.5 g. of titanium chloride dissolved in 50 cc. of diesel oil were added dropwise with stirring and exclusion of air, whereupon the solution became black. Ethylene was passed in with vigorous stirring at 60 to 90° C. After 30 minutes the reaction mixture had become pasty and the ethylene had been polymerized to polyethylene. The reaction mixture was worked up as described in Example 2. In this way 153 g. of a pure white finely powdered polyethylene were obtained.

*Example 8*

10 g. of sodium phenyl produced as described in Zeitschrift für Angewandte Chemie, vol. 49, 456 (1936) and suspended in 30 cc. of hexane were mixed in a nitrogen atmosphere with 1.8 g. of titanium tetrachloride and 200 cc. of hexane and ground for one hour in an oscillating ball mill.

The black suspension produced was transferred to a 500 cc. autoclave and admixed with 60 g. of ethylene. The autoclave was then heated to 100° C. with shaking. After 24 hours the pressure had fallen to 20 atmospheres and the experiment was interrupted. After cooling, 5 g. of ethylene were recovered unchanged. The autoclave contained 52 g. of granular gray colored polyethylene suspended in hexane. For purification purposes, the polyethylene was separated by filtration from the solvent and boiled with methanolic hydrochloric acid, which dissolved the catalyst residues contained in the polyethylene. The product was thereafter washed with methanol and acetone to remove any hydrochloric acid still adhering. In this way a pure white product was obtained.

*Example 9*

30 cc. of a suspension of sodium phenyl in hexane containing 10 grams of sodium phenyl were mixed with 2.3 g. of chromium-III-acetylacetonate and 50 cc. of hexane and ground for two hours in an oscillating ball mill to form a fine black suspension. This was introduced in an atmosphere of nitrogen in a 200 cc. autoclave and 35 g. of ethylene were pumped in. The autoclave was then shaken vigorously for 40 hours at a temperature of 100–110° C. The pressure fell in the course of this time to 20 atmospheres. After cooling 6 g. of ethylene were blown off. The autoclave contained a thick paste of polyethylene in hexane which was worked up as described in Example 8 to give 26 g. of soft spongy polyethylene which softened after heating to 110–130° C. Zirconium tetrachloride, zirconium-IV-acetylacetonate, thorium acetylacetonate, uranium hexachloride or chromium-II-acetlylacetonate can be employed instead of titanium tetrachloride or chromium-III-acetylacetonate.

*Example 10*

A solution of approximately 3.2 g. of potassium phenyl isopropyl in diethyl ether (produced as described in Ann. 473, pp. 1 and 18 et seq. (1929)) was freed from ether by evaporation in vacuo. The deep red solid potassium compound was then suspended in 300 cc. of hexane and ground together with 1 g. of titanium tetrachloride and 150 cc. of hexane for 2 hours in an oscillating ball mill. The black suspension produced was transferred to a 500 cc. autoclave and the autoclave was heated with shaking to 100° C. after introduction of 7 g. of ethylene. After 20 hours the pressure had fallen to 25 atmospheres gauge. The experiment was interrupted. 7 grams of ethylene were recovered after cooling. The autoclave contained 59 g. of a granular gray-colored polyethylene suspended in hexane. Purification was effected as described in Example 8.

The products obtained in accordance with the invention are characterized by their inherent low melt index. The melt index, as is well understood in the art, expresses the characterization of a moldable product to be relatively stable with respect to its viscosity with a relatively wide temperature range. In other words, the viscosity-temperature curve is relatively flat or less steep so that a desired degree of viscosity can be retained over a greater temperature range without the danger of a too great fluidity causing a "running away" condition.

Polyolefins and especially polyethylene prepared in accordance with the invention possess for molecular weights of a magnitude of about 50 to 60,000, a melt index not in excess of substantially about 1. With increasing molecular weights the melt index of the products in accordance with the invention are even lower, being, for instance, of a value of approximately less than 0.1 for molecular weights of a magnitude of approximately 100,000 to 120,000.

The effective or most effective utilization of various catalyst combinations applicable in accordance with the invention makes it in most cases desirable to use a relatively pure initial monomer. As above pointed out, if for instance ethylene contains certain impurities, these may inactivate portions of the heavy metal compound, and/or the organo metal compound present in the solution and may thus undesirably shift the mol ratio initially present between the catalyst components. These difficulties, however, may be avoided if the ethylene or the gas mixture containing ethylene is preliminarily contacted or washed with organic metal compounds, preferably organic compounds of aluminum, before entering the reaction vessel in which it is to be contacted with the herein described catalyst material. When proceeding in this manner, the polymerization of the ethylene is actually carried out in two separate steps.

The organic metal compound useable in the first step of the just described two-step procedure is preferably one corresponding to the general formula RAlXY or RMeY in which R is hydrogen or a hydrocarbon radical, X is R or OR', Y is R or OR', R' is a hydrocarbon radical and Me is a bivalent metal, preferably magnesium or zinc.

We claim:
1. A polymerization catalyst composed of a mixture of a first and second component, said first component being substantially composed of a member of the group consisting of alkali metal alkyls and aralkyls, complexes of alkali metal alkyls and complexes of alkali metal hydrides, with a meta organo compound of the group of metals consisting of magnesium and zinc, and complexes constituted of two metal organo compounds of the group of metals consisting of aluminum, magnesium and zinc, said second component being a heavy metal compound selected from the group consisting of the salts and the freshly precipitated oxides and hydrides of metals of Groups IV–B, V–B and VI–B of the Periodic System, including thorium and uranium, each of said components being present in an amount with respect to the other, to cooperatively act therewith forming an active olefin polymerization catalyst.

2. A polymerization catalyst according to claim 1 in which said second component is a chloride.

3. A polymerization catalyst according to claim 2 in which said chloride is a titanium chloride.

4. A polymerization catalyst according to claim 2 in which said chloride is titanium tetrachloride.

5. A polymerization catalyst according to claim 1, in which said heavy metal is chromium.

6. A polymerization catalyst according to claim 5, in which said heavy metal compound is chromacetylacetonate.

7. A polymerization catalyst according to claim 1, in which said heavy metal is zirconium.

8. A polymerization catalyst according to claim 7, in which said heavy metal compound is zirconium tetrachloride.

9. A polymerization catalyst according to claim 1, in which said heavy metal compound is an acetyl acetonate.

10. A polymerization catalyst according to claim 9 in which said acetyl acetonate is zirconium acetyl acetonate.

11. A polymerization catalyst according to claim 1, in which said heavy metal compound is an oxychloride.

12. A polymerization catalyst according to claim 1, in which said first component is an alkali metal alkyl.

13. A polymerization catalyst according to claim 1, in which said first component is a complex constituted of two metal organo compounds of the group of metals consisting of aluminum, magnesium and zinc, one of said metal organo compounds being an aluminum organo compound.

14. A polymerization catalyst according to claim 1, in which said first component is $Mg(Al(C_2H_5)_4)_2$.

References Cited by the Examiner

UNITED STATES PATENTS

| | | | |
|---|---|---|---|
| 2,721,189 | 10/1955 | Anderson | 252—431 |
| 2,822,357 | 2/1958 | Brebner | 252—431 |
| 2,839,518 | 6/1958 | Brebner | 252—431 |
| 2,887,471 | 5/1959 | Shearer et al. | 252—431 |
| 2,900,372 | 8/1959 | Gresham et al. | 252—429 |
| 2,905,645 | 9/1959 | Anderson et al. | 252—429 |
| 2,908,674 | 10/1959 | Nowlin et al. | 252—431 |
| 2,909,512 | 10/1959 | Bruce | 252—431 |

TOBIAS E. LEVOW, *Primary Examiner.*

JULIUS GREENWALD, *Examiner.*

UNITED STATES PATENT OFFICE
CERTIFICATE OF CORRECTION

Patent No. 3,231,515 January 25, 1966

Karl Ziegler et al.

It is hereby certified that error appears in the above numbered patent requiring correction and that the said Letters Patent should read as corrected below.

Column 1, line 30, for "ethylene" read -- ethylenes --; column 2, line 40, for "application" read -- applications --; line 46, for "as it well" read -- as is well --; column 3, line 16, for "(1901)" read -- 1901) --; column 4, lines 52 and 53, after "organo metal compound" insert a period; column
heavy metal compound 6, line 7, for "ilnvention" read -- invention --; column 9, line 5, strike out "by"; line 57, for "bubled" read -- bubbled --; column 12, line 18, for "-acetlylacetonate" read -- -acetylacetonate --; column 13, line 12, for "meta" read -- metal --; line 18, for "hydrides" read -- hydroxides --.

Signed and sealed this 20th day of December 1966.

(SEAL)
Attest:

ERNEST W. SWIDER
Attesting Officer

EDWARD J. BRENNER
Commissioner of Patents